(12) United States Patent
Hyakutake et al.

(10) Patent No.: US 10,228,059 B2
(45) Date of Patent: Mar. 12, 2019

(54) SEALING DEVICE

(71) Applicant: NOK CORPORATION, Tokyo (JP)

(72) Inventors: Hideharu Hyakutake, Fukushima (JP); Tomoaki Nishimura, Fukushima (JP); Hiroki Matsui, Fukushima (JP); Yuki Sato, Fukushima (JP)

(73) Assignee: NOK CORPORATION, Tokyo (JP)

( * ) Notice: Subject to any disclaimer, the term of this patent is extended or adjusted under 35 U.S.C. 154(b) by 319 days.

(21) Appl. No.: 15/027,819

(22) PCT Filed: Oct. 3, 2014

(86) PCT No.: PCT/JP2014/076495
§ 371 (c)(1),
(2) Date: Apr. 7, 2016

(87) PCT Pub. No.: WO2015/053170
PCT Pub. Date: Apr. 16, 2015

(65) Prior Publication Data
US 2016/0252181 A1    Sep. 1, 2016

(30) Foreign Application Priority Data

Oct. 10, 2013 (JP) .................................. 2013-212658

(51) Int. Cl.
 *F16J 15/3244* (2016.01)
 *F16J 15/3216* (2016.01)
 *F16J 15/3232* (2016.01)

(52) U.S. Cl.
 CPC ....... *F16J 15/3244* (2013.01); *F16J 15/3216* (2013.01); *F16J 15/3232* (2013.01)

(58) Field of Classification Search
 CPC ... F16J 15/3244; F16J 15/3216; F16J 15/3232
 (Continued)

(56) References Cited

U.S. PATENT DOCUMENTS

| | | | |
|---|---|---|---|
| 3,934,888 A | * | 1/1976 | Lutz ..................... F16J 15/3244 |
| | | | 277/559 |
| 5,759,466 A | | 6/1998 | Onuma et al. |

(Continued)

FOREIGN PATENT DOCUMENTS

| | | | |
|---|---|---|---|
| CN | 1147599 A | | 4/1997 |
| CN | 2388421 | * | 7/2000 |

(Continued)

OTHER PUBLICATIONS

Extended European Search Report for Application No. EP 14 85 2762 dated Sep. 21, 2016 (7 pages).

*Primary Examiner* — Nathan Cumar
(74) *Attorney, Agent, or Firm* — Harness, Dickey & Pierce, P.L.C.

(57) ABSTRACT

The purpose of the present invention is to provide a sealing device which has forward and reverse screw threads exhibiting a fluid-pumping action provided on a sliding portion of a seal lip, such that the pumping action is less susceptible to deterioration even with increasing wear on the screw threads and such that leakage of droplets from the screw threads is minimized. To achieve this, the forward and reverse screw threads which exhibit a pumping action on sealing fluid are arranged in a circle on the air-side lateral surface of the sliding portion of the seal lip. The forward and reverse screw threads each have a shape gradually increasing in thread height from the leading end of the lip to the air side. The forward screw threads and/or reverse screw threads are provided with seal protrusions for preventing leakage of droplets.

7 Claims, 6 Drawing Sheets

(58) Field of Classification Search
USPC .......................... 277/599, 309, 349–351, 353
See application file for complete search history.

(56) References Cited

U.S. PATENT DOCUMENTS

| | | | |
|---|---|---|---|
| 5,915,696 A | | 6/1999 | Onuma et al. |
| 2007/0152369 A1* | | 7/2007 | Furuyama ............ F16J 15/3244 264/219 |
| 2010/0194055 A1* | | 8/2010 | Syamoto .............. F16J 15/3244 277/549 |
| 2011/0095486 A1* | | 4/2011 | Nakagawa ............. F16J 15/324 277/549 |
| 2014/0312571 A1* | | 10/2014 | Kurth .................. F16J 15/3244 277/559 |
| 2015/0097344 A1 | | 4/2015 | Hamamoto |

FOREIGN PATENT DOCUMENTS

| | | | |
|---|---|---|---|
| GB | 1556870 A | | 11/1979 |
| JP | H01312274 A | | 12/1989 |
| JP | H07208611 A | | 8/1995 |
| JP | 2558504 B2 | | 11/1996 |
| JP | 2000 081 149 | * | 3/2000 |
| JP | 2000179700 A | | 6/2000 |
| JP | 2001-027326 A | | 1/2001 |
| JP | 03278349 B2 | | 4/2002 |
| JP | 2006125454 A | | 5/2006 |
| JP | 2010-007804 A | | 1/2010 |

\* cited by examiner ial and alternately lining up and arranging forward direction screws 54 which achieve a sealing function based on a pumping action when the shaft rotates in a forward direction (an arrow C), and reverse direction screws 55 which achieve the sealing function based on the pumping action when the shaft rotates in a reverse direction, one by one, or several by several, or several tens by several tens. Each of the screws 54 and 55 is formed into a so-called parallel screw in which its longitudinally perpendicular cross sectional shape (including a screw height and a screw width) is formed uniformly over a whole length of the screw.

SEALING DEVICE

CROSS-REFERENCE TO RELATED APPLICATIONS

This application is a U.S. National Phase Application under 35 U.S.C. 371 of International Application No. PCT/JP2014/076495, filed on Oct. 3, 2014 and published in Japanese as WO 2015/053170 A1 on Apr. 16, 2015. This application claims priority to Japanese Patent Application No. 2013-212658, filed on Oct. 10, 2013. The entire disclosures of the above applications are incorporated herein by reference.

BACKGROUND OF THE INVENTION

Field of the Invention

The present invention relates to a sealing device, and more particularly relates to a sealing device in which a screw achieving a fluid pumping action is provided in a sliding portion of a seal lip. The sealing device according to the present invention is used, for example, in an automobile-related field, or used in a field of a general purpose machine.

Description of the Conventional Art

There has been conventionally known a sealing device in which a screw achieving a pumping action applied to a sealed fluid is provided in an atmosphere side lateral face of a seal lip sliding portion for improving a sealing performance in relation to the sealed fluid such as an oil. In the case that the other sliding member (hereinafter, refer simply to a shaft) such as a rotary shaft rotates in both forward and reverse directions, a bidirectional screw 53 is provided in an atmosphere side lateral face 52 of a sliding portion of a seal lip 51, as shown in FIG. 5.

The bidirectional screw 53 is structured by circumferentially and alternately lining up and arranging forward direction screws 54 which achieve a sealing function based on a pumping action when the shaft rotates in a forward direction (an arrow C), and reverse direction screws 55 which achieve the sealing function based on the pumping action when the shaft rotates in a reverse direction, one by one, or several by several, or several tens by several tens. Each of the screws 54 and 55 is formed into a so-called parallel screw in which its longitudinally perpendicular cross sectional shape (including a screw height and a screw width) is formed uniformly over a whole length of the screw.

The prior art described above can achieve an excellent sealing performance on the basis of the pumping action of each of the screws 54 and 55, however, since each of the screws 54 and 55 is formed as the parallel screw as mentioned above, there is a problem that the pumping action is lowered in the case that wear caused by the sliding motion makes progress.

In order to countermeasure the problem mentioned above, it can be thought that each of the forward direction screw 54 and the reverse direction screw 55 is formed into a ship bottom-like screw in place of the parallel screw, as shown in FIG. 6 which shows a comparative example with the present invention. Since the ship bottom-like screw is provide with a shape that a screw height is enlarged little by little from a lip leading end 56 toward an atmosphere side B, the screw height thereof is hard to be lowered even if the wear makes progress. Accordingly, the pumping action is hard to be lowered.

However, even in the case that each of the forward direction screw 54 and the reverse direction screw 55 is formed into the ship bottom-like screw as mentioned above, sealed fluid may leak by spray from the screws 54 and 55. In order to suppress the leak by spray from the screws 54 and 55, an additional countermeasure is necessary.

SUMMARY OF THE INVENTION

Problem to be Solved by the Invention

The present invention is made by taking the above points into consideration, and an object of the present invention is to provide a sealing device having forward direction screws and reverse direction screws achieving a fluid pumping action provided in a sliding portion of a seal lip, wherein the pumping action is hard to be lowered even if wear of the screws makes progress, and leak by spray from the screws can be suppressed.

Means for Solving the Problem

In order to achieve the object mentioned above, in a sealing device according to claim 1 of the present invention, forward direction screws and reverse direction screws achieving a pumping action in relation to a sealed fluid are circumferentially provided in line in an atmosphere side lateral face of a seal lip sliding portion, each of the forward direction screws and the reverse direction screws has such a shape that a screw height is enlarged little by little from a lip leading end toward an atmosphere side, and a seal projection for preventing leak by spray is provided in any one or both of the forward direction screws and the reverse direction screws.

Further, a sealing device according to claim 2 of the present invention is the sealing device described in claim 1 mentioned above, wherein the seal projection is provided associated with the reverse direction screw, and is extended from the reverse direction screw toward an opposite side to a forward rotating direction of the shaft.

In the sealing device according to the present invention having the structure mentioned above, each of the forward direction screws and the reverse direction screws has such a shape that the screw height is enlarged little by little from the lip leading end toward the atmosphere side, that is, a corresponding to the ship bottom-like screw can be obtained. Accordingly, the screw height is hard to be lowered even if the wear makes progress. As a result, the pumping action is hard to be lowered. Further, the seal projection for preventing the leak by spray is provided in any one or both of the forward direction screws and the reverse direction screws. Therefore, the seal projection acts as a dam against the leak by spray of the seal fluid. As a result, it is possible to reduce an amount of the leak by spray.

The seal projection for preventing the leak by spray is provided in any one or both of the forward direction screw and the reverse direction screw as mentioned above. However, in the case that the shaft normally rotates forward, the seal projection for preventing the leak by spray is preferably provided associated with the reverse direction screw. In this case, the seal projection is extended from the reverse direction screw toward an opposite side to the forward rotating direction of the shaft.

Effect of the Invention

The present invention achieves the following effects.

More specifically, in the present invention, each of the forward direction screws and the reverse direction screws has such a shape that the screw height is enlarged little by little from the lip leading end toward the atmosphere side, as mentioned above. Accordingly, the screw height is hard to be lowered even if the wear makes progress, and the pumping action is hard to be lowered. Further, the seal projection for preventing the leak by spray is provided in any one or both of the forward direction screws and the reverse direction screws. Therefore, the seal projection acts as a dam against the leak by spray of the seal fluid. As a result, it is possible to reduce an amount of the leak by spray. Therefore, it is possible to provide the sealing device in which the pumping action is hard to be lowered even if the wear of the screw makes progress, and the leak by spray from the screw can be suppressed.

DETAILED DESCRIPTION OF PREFERRED EMBODIMENTS

The case that the forward direction screws and the reverse direction screws are circumferentially and alternately provided is included in "forward direction screws and reverse direction screws are circumferentially provided in line" described in claim 1 mentioned above in the present invention. Further, the case that forward direction screws and the reverse direction screws are circumferentially provided half circumference by half circumference (the forward direction screws are circumferentially provided over one half circumference and the reverse direction screws are circumferentially provided over the other half circumference is also included in "forward direction screws and reverse direction screws are circumferentially provided in line" described in claim 1 mentioned above in the present invention.

Embodiments

Next, a description will be given of embodiments according to the present invention with reference to the accompanying drawings.

First Embodiment

Figure 1:
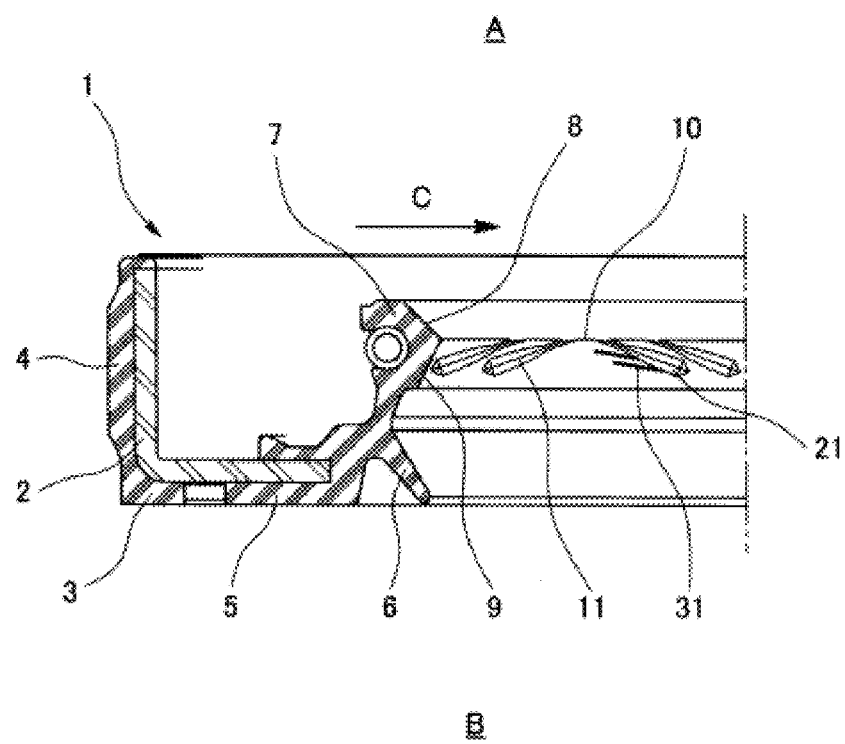
FIG. 1 is a half cut cross sectional view of a sealing device according to a first embodiment of the present invention.
Figure 2:
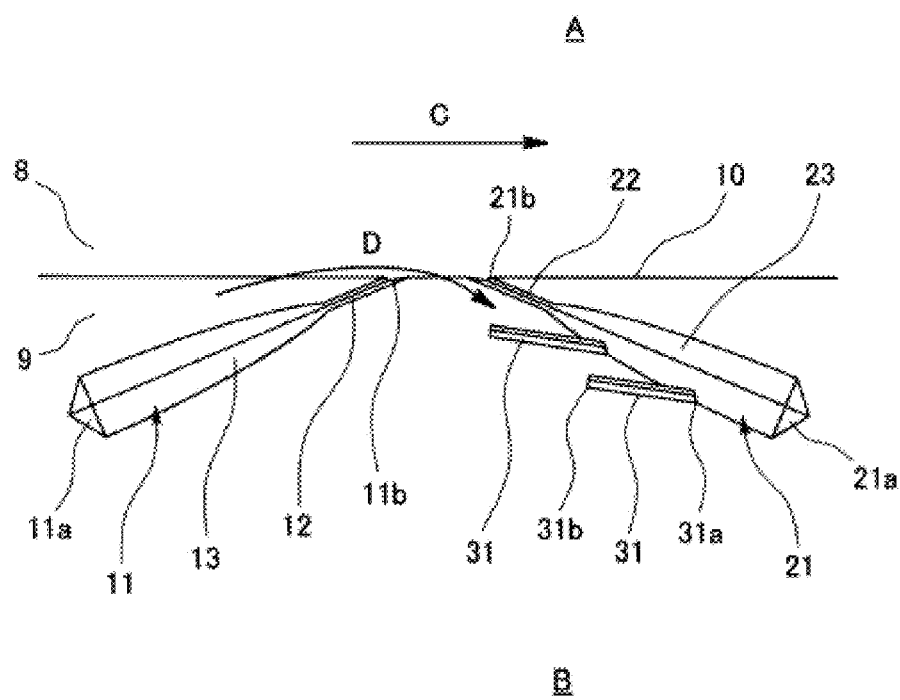
FIG. 2 is an enlarged view of a substantial part in FIG. 1.

FIG. 1 shows a half cut cross section of a sealing device (an oil seal) 1 according to a first embodiment of the present invention. FIG. 2 shows a substantial part in FIG. 1 in an enlarged manner. The sealing device 1 according to the embodiment is a bidirectional rotation seal corresponding to rotation in both forward and reverse directions of a shaft (the other member which is not shown), and is structured as follows.

More specifically, as shown in FIG. 1, there is provided a seal lip (a main lip) 7 which slidably comes into close contact with a peripheral surface of the shaft together with an outer peripheral seal portion 4, an end face cover portion 5 and a dust lip (a sub lip) 6 by a rubber-like elastic body 3 attached (vulcanization bonded) to a metal ring 2, and a leading end sliding portion of the seal lip 7 is provided with a sealed fluid side lateral face (an inclined surface) 8 and an atmosphere side lateral face (an inclined surface) 9. Reference numeral 10 denotes a lip leading end where both the lateral faces 8 and 9 intersect, and is formed as a pointed end.

The atmosphere side lateral face 9 in both the lateral faces 8 and 9 of the seal lip 7 is provided with a forward direction screw (a forward screw portion) 11 which achieves a sealing function by pushing back sealed fluid to a sealed fluid side A on the basis of a pumping action when the shaft rotates in a forward direction (rotates forward as shown by an arrow C), and is provided with a reverse direction screw (a reverse screw portion) 21 which achieves the sealing function by pushing back the sealed fluid to the sealed fluid side A on the basis of the pumping action when the shaft rotates in a reverse direction (rotates reverse). The forward direction screws 11 and the reverse direction screws 21 are circumferentially provided half circumference by half circumference, and a changing portion between the forward direction screws 11 and the reverse direction screws 21 is shown in the drawing.

As shown in FIG. 2 in an enlarged manner, the forward direction screw 11 is constructed by a spiral projection. A direction of the spiral is set to a direction which is inclined forward in a forward rotating direction C of the shaft from its atmosphere side end portion 11a toward a sealed fluid side end portion 11b. Further, the forward direction screw 11 is structured such that a parallel screw 12 starting from the lip leading end 10 and a ship bottom-like screw 13 connecting thereto are integrally provided.

The parallel screw 12 is formed so that a longitudinally perpendicular cross sectional shape thereof (including a screw height and a screw width) is uniform over a whole length of the screw, and the ship bottom-like screw 13 is provided with such a shape that a longitudinally perpendicular cross section thereof (including a screw height and a screw width) is enlarged little by little from the lip leading end 10 side (the sealed fluid side A) toward the atmosphere side B. Since the minimum height of the ship bottom-like screw 13 is set to be identical to the height of the parallel screw 12, the maximum height of the ship bottom-like screw 13 is set to be larger than the height of the parallel screw 12. Each of the longitudinally perpendicular cross sections of the parallel screw 12 and the ship bottom-like screw 13 is formed into a triangular shape or an approximately triangular shape.

On the other hand, the reverse direction screw 21 is also constructed by a spiral projection. A direction of the spiral is set to a direction which is inclined rearward in the forward rotating direction C of the shaft from its atmosphere side end portion 21a toward a sealed fluid side end portion 21b. Further, the reverse direction screw 21 is structured such that a parallel screw 22 starting from the lip leading end 10 and a ship bottom-like screw 23 connecting thereto are integrally provided.

The parallel screw 22 is formed so that a longitudinally perpendicular cross sectional shape thereof (including a screw height and a screw width) is uniform over a whole length of the screw, and the ship bottom-like screw 23 is provided with such a shape that a longitudinally perpendicular cross section thereof (including a screw height and a screw width) is enlarged little by little from the lip leading end 10 side (the sealed fluid side A) toward the atmosphere side B. Since the minimum height of the ship bottom-like screw 23 is set to be identical to the height of the parallel screw 22, the maximum height of the ship bottom-like screw 23 is set to be larger than the height of the parallel screw 22. Each of the longitudinally perpendicular cross sections of the parallel screw 22 and the ship bottom-like screw 23 is formed into a triangular shape or an approximately triangular shape.

Further, a seal projection 31 for preventing leak by spray is provided as a particularly characteristic structure of the present invention, and the seal projection 31 is provided associated with the reverse direction screw 21 in the embodiment, and is extended toward an opposite side to the forward rotating direction C of the shaft from the reverse direction screw 21.

The seal projection 31 is structured as follows.

In the seal projection 31, a base end portion 31a thereof is connected to the ship bottom-like screw 23 of the reverse direction screw 21, that is, is connected to a halfway position in a longitudinal direction of the ship bottom-like screw 23.

The seal projection 31 is constructed by a spiral projection, and a direction of the spiral is set to a direction which is inclined rearward in the forward rotating direction C of the shaft from its base end portion 31a toward a leading end portion 31b. Therefore, the seal projection 31 is inclined in the same direction as the ship bottom-like screw 23 or the reverse direction screw 21 to which the seal projection 31 is connected, however, an angle of incline in relation to the lip leading end 10 is set to be smaller than the ship bottom-like screw 23 or the reverse direction screw 21. The seal projection 31 may be extended in a circumferential direction of the sealing device 1, and the direction of the spiral may be a direction which is inclined forward in the forward rotating direction C of the shaft from the leading end portion 31b toward the base end portion 31a a little.

The seal projection 31 is formed so that a longitudinally perpendicular cross sectional shape (including a projection height and a projection width) thereof is uniform over a whole length of the projection, in the same manner as the parallel screw 22. Further, a height thereof is formed to be smaller than the height (the maximum height) of the ship bottom-like screw 23, and is set to be identical or approximately identical to the height of the parallel screw 22 and the minimum height of the ship bottom-like screw 23. Further, the longitudinally perpendicular cross sectional shape is formed into a triangular shape or an approximately triangular shape.

The height of the seal projection 31 is formed to be smaller than the height (the maximum height) of the ship bottom-like screw 23 because the ship bottom-like screw 23 does not come into contact with the surface of the shaft if the height of the seal projection 31 is made larger than the ship bottom-like screw 23, whereby the pumping function can not be achieved. Thus, the ship bottom-like screw 23 can be brought into contact with the shaft surface by forming the height of the seal projection 31 smaller than the height (the maximum height) of the ship bottom-like screw 23. As a result, it is possible to make the ship bottom-like screw 23 achieve the pumping function.

Further, the height of the seal projection 31 is set to be identical or approximately identical to the height of the parallel screw 22 because the parallel screw 22 does not come into contact with the shaft surface if the height of the seal projection 31 is made larger than the parallel screw 22, whereby the pumping function can not be achieved. On the contrary, in the case that the height is made smaller than the parallel screw 22, the pumping function of the parallel screw 22 is not obstructed, however, the effect of suppressing the leak by spray by the seal projection 31 becomes small. Thus, the parallel screw 22 can be brought into contact with the shaft surface by setting the height of the seal projection 31 to be identical or approximately identical to the height of the parallel screw 22. As a result, it is possible to make the parallel screw 22 achieve the pumping function, and it is possible to achieve the effect of suppressing the leak by spray by the seal projection 31.

Two seal projections 31 are provided in parallel each other to every one reverse direction screw 21. However, the number of the seal projection 31 may be one or plural number equal to or more than three.

The sealing device 1 having the structure mentioned above is installed, for example, to an inner periphery of a shaft hole of a housing, and is structured such as to seal the sealed fluid within the machine so as to prevent the sealed fluid from leaking out to an outside of the machine by the seal lip 7 slidably coming into close contact with the peripheral surface of the shaft inserting into the shaft hole. The sealing device is structured as both rotation seal in correspondence to the rotation of the shaft in both the forward and reverse directions as mentioned above, and is characterized by a point that the following operations and effects can be achieved by the structure mentioned above.

More specifically, in the sealing device 1 having the structure mentioned above, since the forward direction screw 11 and the reverse direction screw 21 are respectively provided with the ship bottom-like screws 13 and 23 which are formed into the shapes that the screw heights are enlarged little by little from the lip leading end 10 toward the atmosphere side B, the screw height is hard to be lowered even if the wear makes progress together with the sliding motion with the shaft. Accordingly, the pumping action is hard to be lowered.

Further, since the seal projection 31 is extended from the reverse direction screw 21 toward the opposite side to the forward rotating direction C of the shaft associated with the reverse direction screw 21, the seal projection 31 acts as a damp against the leak by spray of the sealed fluid. As a result, it is possible to reduce an amount of the leak by spray. The spray of the sealed fluid is created, for example, by a part of the fluid which is pushed back to the lip leading end 10 by the forward direction screw 11 achieving the pumping action, the part of the fluid flying in all directions to the atmosphere side B due to a centrifugal force when the shaft forward rotates (an arrow D). Since the seal projection 31 is provided at a position receiving the spray, it is possible to effectively suppress generation of the leak by spray. Further, since the seal projection 31 acts as the dam, an effect of inhibiting the dusts from entering from the atmosphere side B can be expected.

In the embodiment mentioned above, the seal projection 31 is extended from the reverse direction screw 21 toward the opposite side to the forward rotating direction C of the shaft associated with the reverse direction screw 21 so that the seal projection 31 acts as the damp when the shaft forward rotates. However, in the case of making the seal projection 31 act as the dam when the shaft reverse rotates, the seal projection 31 may be provided so as to extend from the forward direction screw 11 toward the forward rotating direction C associated with the forward direction screw. Further, the structure may be made such as to be provided with both the seal projection 31 which is extended from the reverse direction screw 21 toward the opposite side to the forward rotating direction C associated with the reverse direction screw 21, and the seal projection 31 which is extended from the forward direction screw 11 toward the forward rotating direction C of the shaft associated with the forward direction screw 11, so as to respectively correspond to the bidirectional rotation of the shaft.

Further, in the embodiment mentioned above, the seal projection 31 is provided to be branched from the reverse direction screw 21 or the forward direction screw 11, however, it can be thought that the seal projection 31 is provided so as to be embedded at a halfway position in the longitudinal direction of the reverse direction screw 21 or the forward direction screw 11.

Second Embodiment

Figure 3:
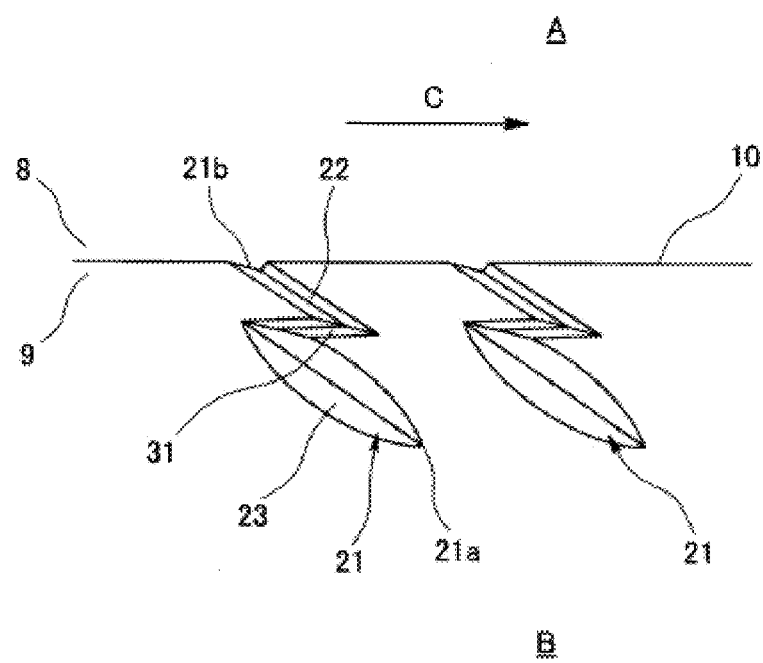
FIG. 3 is a front elevational view of a substantial part of a sealing device according to a second embodiment of the present invention

FIG. 3 shows an example in which the seal projection 31 is provided so as to be embedded at the halfway position in the longitudinal direction of the reverse direction screw 21, that is, the seal projection 31 is provided between the parallel screw 22 and the ship bottom-like screw 23 in the reverse direction screw 21.

Third Embodiment

Figure 4:
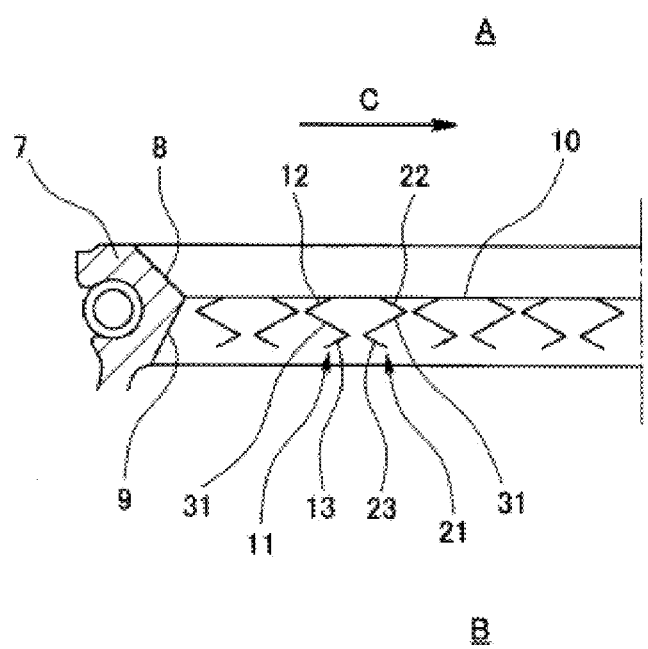
FIG. 4 is a cross sectional view of a substantial part of a sealing device according to a third embodiment of the present invention
Figure 5:
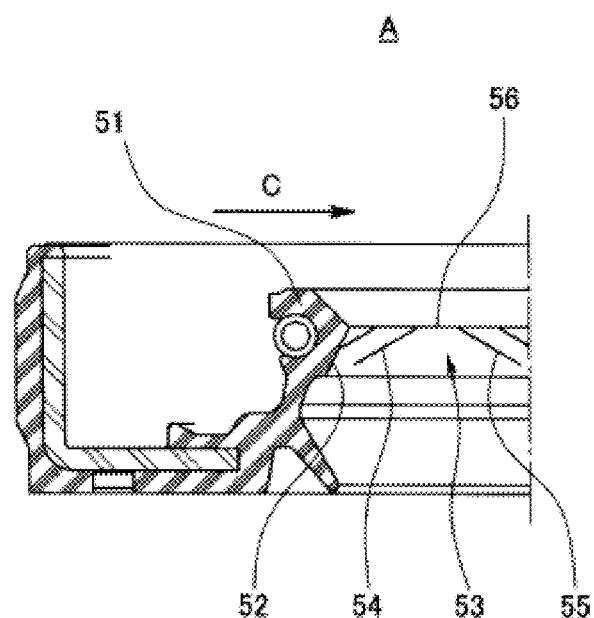
FIG. 5 is a half cut cross sectional view of a sealing device according to the prior art.
Figure 6:
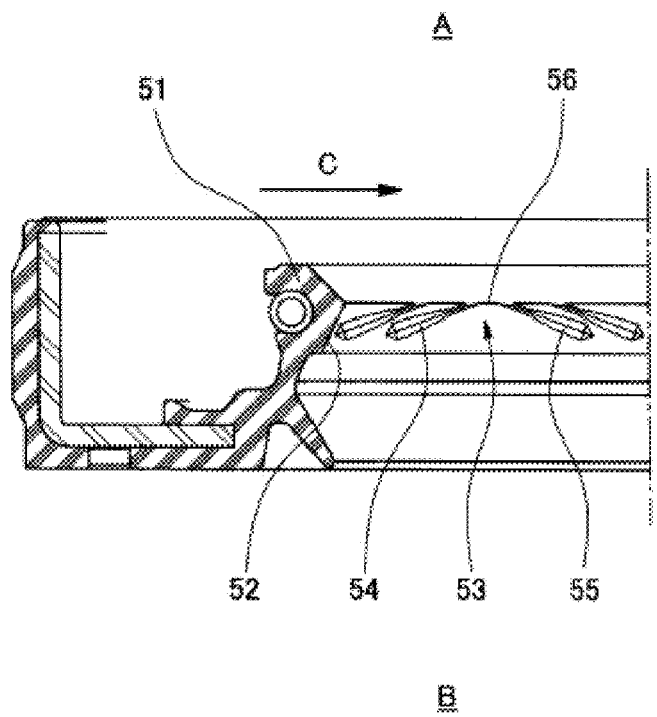
FIG. 6 is a half cut cross sectional view of a sealing device according to a comparative example.

Further, FIG. 4 shows an example in which the seal projection 31 is provided so as to be embedded at the halfway position in the longitudinal direction of the reverse direction screw 21, that is, the seal projection 31 is provided between the parallel screw 22 and the ship bottom-like screw 23 in the reverse direction screw 21. Further, at the same time, the seal projection 31 is provided so as to be embedded at the halfway position in the longitudinal direction of the forward direction screw 11, that is, the seal projection 31 is provided between the parallel screw 12 and the ship bottom-like screw 13 in the forward direction screw 11.

According to the second and third embodiments mentioned above, each of the screws 11 and 21 is formed into a crank-like bent shape as well as the same operations and effects as those of the first embodiment can be achieved. Therefore, a circumferential space per one screw can be made smaller. As a result, more number of screws can be lined up circumferentially at this degree, and it is possible to enhance the pumping action and the sealing function achieved by the screws. Further, since the seal projection 31 acts as the dam as mentioned above, the dam can inhibit the dusts from entering from the atmosphere side B.

What is claimed is:

1. A sealing device comprising:
   a plurality of screws that achieve a pumping action in relation to a sealed fluid that are circumferentially provided in a line on an atmosphere side lateral face of a seal lip sliding portion, each of the plurality of screws having a shape such that a screw height increases as the screw extends from a lip leading end toward an atmosphere side, and
   a seal projection for preventing leak by spray that is provided on at least one of the plurality of screws,
   wherein the seal projection extends outward from the one screw in a direction toward an immediately adjacent screw,
   a first end of the seal projection is in contact with a midsection of the one screw,
   the seal projection has a height that is less than that of the one screw at a location where the seal projection is in contact with the one screw, and
   a second and opposite end of the seal projection is spaced apart from the immediately adjacent screw.

2. The sealing device according to claim 1, wherein the plurality of screws includes forward direction screws and reverse section screws, and the one screw is a reverse direction screw.

3. A sealing device, comprising:
   a seal lip having an atmosphere side inclined lateral face and a sealed fluid side inclined lateral face that cooperatively define a leading end of the seal lip; and
   a plurality of screws provided on the atmosphere side inclined lateral face,
   wherein each of the screws includes:
      a parallel screw section that extends away from the leading end of the seal lip toward an atmosphere side of the sealing device;
      a seal projection section that extends outward from the parallel screw section in a direction that is parallel with the leading end of the seal lip; and
      a ship-bottom-shaped screw that extends outward from the seal projection section toward the atmosphere side of the sealing device, and
   the ship-bottom-shaped screw increasing in height in a direction from the seal projection section toward the atmosphere side of the sealing device.

4. The sealing device according to claim 3, wherein the parallel screw section is connected to a first end of the seal projection section, and the ship-bottom-shaped screw is connected to a second and opposite end of the seal projection section.

5. The sealing device according to claim 3, wherein the parallel screw section and the ship-bottom-shaped screw extend in parallel directions.

6. The sealing device according to claim 3, wherein the seal projection section extends toward an adjacent screw.

7. The sealing device according to claim 6, wherein the seal projection section is spaced apart from the adjacent screw.

* * * * *